Nov. 6, 1945.   C. T. STORM ET AL   2,388,349
MOTOR VEHICLE IDENTIFICATION TAG HOLDER
Filed April 18, 1944   2 Sheets-Sheet 1
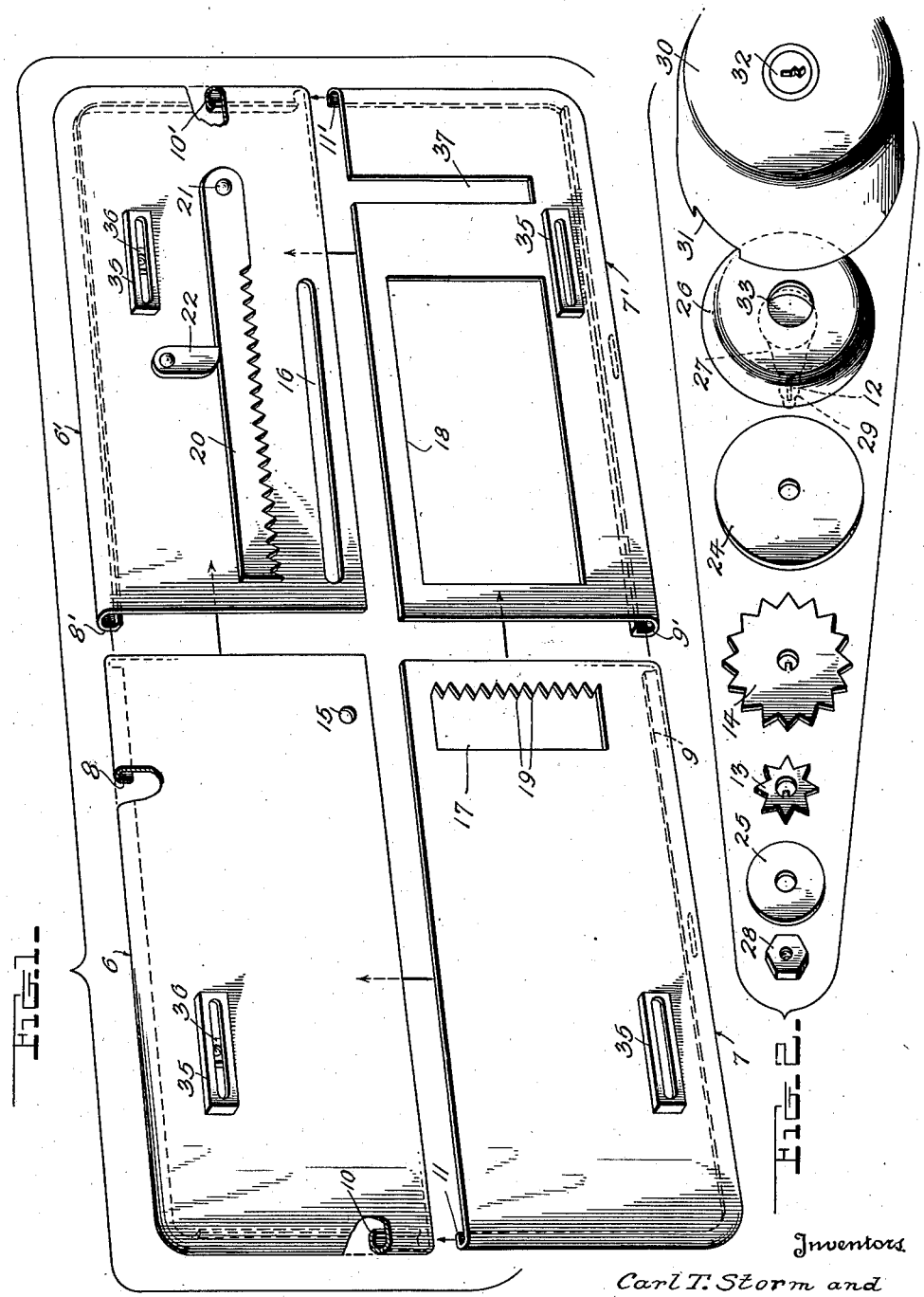
Inventors
Carl T. Storm and
Louise H. Storm
By
H. B. Willson & Co.
Attorney

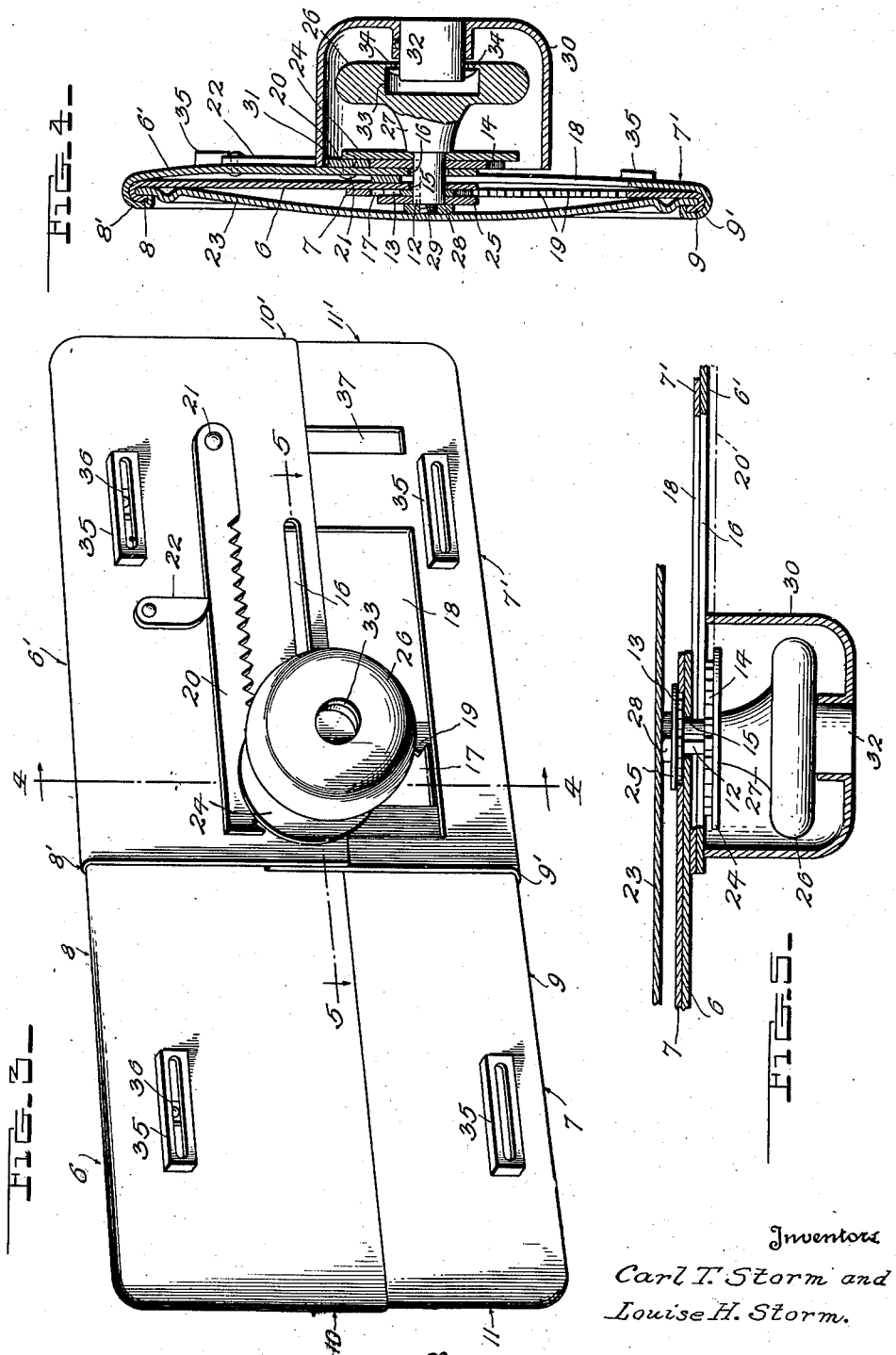

Patented Nov. 6, 1945

2,388,349

UNITED STATES PATENT OFFICE 2,388,349

MOTOR VEHICLE IDENTIFICATION TAG HOLDER

Carl T. Storm and Louise H. Storm, Detroit, Mich.

Application April 18, 1944, Serial No. 531,584

6 Claims. (Cl. 40—125)

The invention relates to a novel holder for a motor vehicle identification plate or tag, and to prevent confusion with various plates embodied in the construction, of the holder, said identification plate or tag will be hereinafter referred to only as a tag.

One object of the invention is to provide a novel and advantageous tag holder which permits unusually speedy removal of one tag and reclamping of the same tag after attachment of a year tab, or clamping of a new tag.

In carrying out the above end, a further object is to provide a holder including slidably overlapped plates having telescoped hook flanges to engage the edges of the tag, and a single operating member which acts to operate certain pinions and racks to relatively slide the plates to and from tag-holding positions.

Another object is to make novel provision whereby one of the racks may be unmeshed from its cooperating pinion to permit proper initial adjustment of the holder to the tag regardless of how much the proportion of length to width of the tag may be varied from year to year.

A still further object is to provide novel lock-held means to prevent unauthorized release of the tag-holding plates and the above mentioned rack after the tag has been clamped in the holder.

Yet another object is to provide a structure which is rather simple and inexpensive, yet will be efficient and desirable, and long-lived.

With the foregoing in view, the invention resides in the novel subject matter hereinafter described and claimed, description being accomplished by reference to the accompanying drawings:

Fig. 1 is a disassembled perspective view partly broken away and in section showing the relatively slidable plates with their hook flanges, and the racks.

Fig. 2 is a disassembled perspective view of the operating and locking means.

Fig. 3 is a perspective of the complete holder with the locking means removed.

Figs. 4 and 5 are respectively, a vertical sectional view and a horizontal sectional view as indicated by lines 4—4 and 5—5 of Fig. 3, the locking means being applied, however, in these two views.

A preferred construction has been shown, embodying only four slidably engaged plates having telescoped tag-engaging hook flanges at their edges, but in other forms of the invention, it will be obvious that a different number of plates could well be employed, and moreover, it will be clear that various minor changes could be made within the scope of the invention as claimed.

The numerals 6 and 6' denote two rectangular upper plates, and 7 and 7' refer to two similar lower plates. The upper edges of the plates 6 and 6' are provided with hook flanges 8 and 8' which telescope when said plates 6 and 6' are overlapped, and the lower edges of the plates 7 and 7' are also formed with hook flanges 9 and 9' to telescope when these two plates are overlapped. The outer ends of the plates 6 and 6' have hook flanges 10 and 10', and the outer ends of the lower plates 7 and 7' are formed with hook flanges 11 and 11' to telescope with said flanges 10 and 10' when said lower plates 7 and 7' are slidably overlapped with said upper plates 6 and 6'.

An operating shaft 12 carries two pinions 13 and 14 which are keyed or otherwise secured thereto, said shaft being rotatably mounted in an opening 15 in the plate 6 and extending through a horizontal slot 16 in the lower edge portion of the plate 6'. This shaft also passes through a vertically elongated slot 17 in the plate 7 and through a much larger opening 18 in the plate 7'. The pinion 13 is received in the slot 17 of the plate 7, and this plate is provided with a vertical rack which is formed by providing one vertical wall of said slot with teeth 19, said teeth being in mesh with said pinion 13 so that rotation of the latter will relatively slide the plates 6 and 7 and will also relatively slide the plates 6' and 7' (due to the connection of 6 with 6' and 7 with 7' by means of the telescoped hook flanges 8—8' and 9—9'). As the plates 6' and 7' slide relatively, the opening 18 prevents the shaft 12 from interfering.

The pinion 14 lies against the rear side of the plate 6', and this plate carries a rack 20 which is pivoted thereto at 21, said rack being in mesh with said pinion 14, and held in operative relation with said pinion by means of a pivoted abutment 22 also carried by plate 6'. It will thus be seen that when pinion 14 is rotated, it will relatively slide the plates 6 and 6' horizontally, and these plates will correspondingly slide the plates 7 and 7', due to connection of 6 with 7 by means of 10 and 11, and 6' with 7' by means of 10' and 11'. Thus, rotation of the operating shaft 12 in one direction will relatively move the four plates 6, 7, 6' and 7' inwardly to clamp the tag 23, and rotation of said operating shaft in the opposite direction will relatively move said plates outwardly to release said tag. When initially adjusting the holder to the tag, the upper and lower hook flanges may engage said tag before the other hook flanges engage the ends of said tag, or vice versa. When this occurs, the abutment 22 is swung upwardly and the rack 20 is upwardly swung out of engagement with the pinion 14. This permits proper initial setting of the holder with respect to the tag, after which rack 20 is again meshed with pinion 14 and held meshed by swinging the abutment 22 downwardly to its operative position.

To prevent the rack 20 from springing out of engagement with the pinion 14, there is preferably a large washer 24 on the shaft 12. Another washer 25 on said shaft 12 abuts the front side of the plate 7 and holds this plate against such springing as to unmesh its rack teeth 19 from the pinion 13. The rear end of shaft 12 has a suitable operating knob 26, said knob having a hub 27 abutting the washer 24, and the front end of said shaft 12 is provided with a nut 28 tightened against a shoulder 29 and holding the various parts in assembled relation.

A cap 30 has been shown to normally house the knob 26 and prevent unauthorized turning of the shaft 12. This cap may be locked in place in any suitable way and in the present disclosure it is formed with notches 31 which receive the rack 20, the upper edges of said notches abutting said rack 20 to lock it positively in engagement with the pinion 14. In the present showing, the cap 30 carries a key-actuated lock 32, the inner end of which is receivable in a recess 33 in the center of the knob 26, said lock having bolts 34 which are projectable into the recess to lock the cap to the knob. The recess is of course so shaped that the bolts 34 cannot establish a driving connection from the casing 30 to the knob 26 and thus even if said casing or cap 30 could be forcibly rotated, its rotation could not turn the shaft 12 to release the various plates from engagement with the tag 23. When the lock 32 is released, the cap 30 is readily removable, whereupon the knob 26 may be turned to cause the holder to release the tag 23. Either another tag may then be inserted and the knob rotated in the other direction to clamp it, or the same tag with a newly attached year-tab may be reclamped in the holder. Whenever adjusting the holder to a new tag, the rack 20 will in all probability be released to permit the necessary adjustment of length to width, as above explained.

Any suitable provision may be made for attaching the holder to a carrying bracket on the vehicle. For illustrative purposes, slotted nut guides 35 have been shown stamped rearwardly from the plates 6, 6', 7 and 7', and any two or all of these guides may slidably hold nuts 36 for engagement with attaching bolts, the nuts being of course non-rotatably held by the guides.

When the pivot 21 for the rack 20 is in the form of a rivet which is not countersunk at its inner end, as in the present disclosure, the plate 7' will have a vertical slot 37 to accomodate said rivet.

From the foregoing taken in connection with the accompanying drawings, it will be seen that novel and advantageous provision has been made for carrying out the objects of the invention, and while preferred features of construction have been illustrated, attention is again invited to the possibility of making variations within the scope of the invention as claimed.

What is claimed is:

1. In a license tag holder, a plurality of slidably overlapped plates having slidably telescoped hook flanges to engage the edges of the license tag, a manually rotatable operating member mounted on one of said plates, pinions secured to said operating member, racks meshing with said pinions and connected with certain of said plates for relatively sliding said plates to engage their hook flanges with the tag as said operating member is rotated, at least one of said racks being connected for unmeshing with its cooperating pinion when initially adjusting the plates to the tag, and means engageable with one of said racks to hold it in mesh with said cooperating pinion after said initial adjustment.

2. A license tag holder comprising two slidably overlapped upper plates having telescoped hook flanges at their upper edges to engage the upper edge of the tag, two slidably overlapped lower plates having telescoped hook flanges at their lower edges to engage the lower edge of the tag, said lower plates being slidably overlapped with said upper plates, the outer ends of said upper plates and the outer ends of said lower plates having telescoped hook flanges to engage the ends of the tag, a manually rotatable operating member mounted on one of said plates, two pinions secured to said operating member, one rack secured to a second one of said plates and meshing with one of said pinions for vertically sliding said plates relatively as said operating member is rotated, a second rack meshing with the other of said pinions and means connecting said second rack with a third one of said plates for horizontally sliding said plates relatively as said operating member is rotated, said connecting means for said second rack being constructed to allow unmeshing of said second rack when initially adjusting the plates to the tag, and means on said third one of said plates and engageable with said second rack for holding the latter in engagement with its cooperating pinion after said initial adjustment.

3. A license tag holder comprising two slidably overlapped upper plates having telescoped hook flanges at their upper edges to engage the upper edge of the tag, two slidably overlapped lower plates having telescoped hook flanges at their lower edges to engage the lower edge of the tag, said lower plates being slidably overlapped with said upper plates, the outer ends of said upper plates and the outer ends of said lower plates having telescoped hook flanges to engage the ends of the tag, a manually rotatable operating member mounted on one of said plates, two pinions secured to said operating member, one rack secured to a second one of said plates and meshing with one of said pinions for vertically sliding said plates relatively as said operating member is rotated, a second rack meshing with the other of said pinions, and means pivoting said second rack to a third one of said plates for horizontally sliding said plates relatively as said operating member is rotated, said pivoting means for said second rack permitting unmeshing of said second rack when initially adjusting the plates to the tag, and means on said third one of said plates and engageable with said second rack for holding the latter in engagement with its cooperating pinion after said initial adjustment.

4. A structure as specified in claim 1; together with lock-held means for preventing unauthorized actuation of said operating member, said lock-held means having means engageable with said one of said racks to hold it in mesh with said cooperating pinion.

5. A structure as specified in claim 2; said second rack being exposed at the back of the holder, said operating member having a knob also exposed at the back of the holder, and a lock-held cap to fit over said knob and bar access thereto, said cap having a portion to abut said second rack and hold it in mesh with said cooperating pinion.

6. A license tag holder comprising two slidably overlapped upper plates having telescoped hook flanges at their upper edges to engage the upper edge of the tag, two slidably overlapped lower plates having telescoped hook flanges at their lower edges to engage the lower edge of the tag, said lower plates being slidably overlapped with said upper plates, the outer ends of said upper plates and the outer ends of said lower plates having telescoped hook flanges to engage the ends of the tag, a manually rotatable operating member mounted on one of said plates, two pinions secured to said operating member, one rack secured to a second one of said plates and meshing with one of said pinions for vertically sliding said plates relatively as said operating member is rotated, a second rack meshing with the other of said pinions, and means connecting said second rack with a third one of said plates for horizontally sliding said plates relatively as said operating member is rotated.

CARL T. STORM.
LOUISE H. STORM.